United States Patent [19]
Gonzalez

[11] Patent Number: 5,090,378
[45] Date of Patent: Feb. 25, 1992

[54] DUAL NOZZLE SINGLE PUMP FUEL INJECTION SYSTEM

[75] Inventor: Cesar Gonzalez, Wichita, Kans.

[73] Assignee: The Cessna Aircraft Company, Wichita, Kans.

[21] Appl. No.: 661,832

[22] Filed: Feb. 22, 1991

[51] Int. Cl.⁵ .................. F02B 19/10; F02B 19/12; F02M 63/02

[52] U.S. Cl. .................. 123/275; 123/300; 123/406

[58] Field of Search .......... 123/275, 300, 299, 406

[56] References Cited

U.S. PATENT DOCUMENTS

| | | | |
|---|---|---|---|
| 2,914,043 | 11/1959 | Nallinger | 123/275 |
| 3,990,413 | 11/1976 | Pischinger | 123/275 |
| 4,239,023 | 12/1980 | Simko | 123/275 |
| 4,590,904 | 5/1986 | Wannenwetsch | 123/300 |
| 4,681,073 | 7/1987 | Poore | 123/300 |

*Primary Examiner*—Andrew M. Dolinar
*Attorney, Agent, or Firm*—Edward L. Brown, Jr.

[57] ABSTRACT

A fuel-injection system for a stratified charge hybrid internal combustion engine including a main combustion chamber and prechamber, fuel injectors in both the main chamber and the prechamber which open at higher and lower pressure levels respectively to sequentially inject fuel into the prechamber and main chamber. The system also includes a timed-spark ignition means in the prechamber and an engine-driven and timed fuel injection pump having a variable output capacity which varies with the power level requirements, the injection pump being supplied by a low pressure charge pump. The injection system further includes a shuttle valve with a shuttle spool positioned therein defining a prechamber supply chamber on one side thereof and a spool activation chamber on the opposite side; the initial charge from the injection pump actuates the spool means from its first to its second position valving closed charging pressure into the prechamber supply chamber with further displacement of the spool supplying the charge for the prechamber injector until the spool means reaches a stop whereupon the fuel pressure from the injection pump rises to the opening pressure level of the main injector, flowing through the spool actuation chamber to the main injector and an electrical ignition trigger means positioned in the shuttle valve which fires the ignition means as the spool means moves from its first position.

6 Claims, 2 Drawing Sheets

DUAL NOZZLE SINGLE PUMP FUEL INJECTION SYSTEM

BACKGROUND OF THE INVENTION

This invention relates in general to fuel injection systems in internal combustion piston engines and more particularly it relates to a stratified charge hybrid type engine having dual injectors, one in the prechamber and the other one in the main chamber, and a single engine driven and timed injection pump providing for both injectors in sequential order and a trigger for timed spark ignition. The engine is hybrid in the sense of having transitional combustion modes from spark-ignited stratified charge mode at lower power, to a spark-assisted compression ignition at higher power loads and a compression ignition mode at maximum power loads. The engine is a low compression engine which burns turbine fuels and has no specific octane or cetane requirements. The engine is described in further detail in U.S. Pat. No. 4,594,976 and in U.S. Pat. No. 4,765,293.

Stratified charge engines which include pilot chambers and main chambers have been in existence for over 50 years as exemplified by the Ricardo U.S. Pat. No. 2,191,042. These type of engines, in isolated cases, have successfully operated with turbine fuels, however, they have been in ground transportation applications of low specific power output types.

A number of prior art patents utilize dual injectors which are ignited by an electrical spark as typified by Hoffman, U.S. Pat. No. 2,902,011 and Loyd U.S. Pat. No. 4,141,940. Both of the latter mentioned engines are low specific power output engines that require relatively wide injection timing spreads between pilot and main chambers of approximately 40° which limits the power and speed capabilities of the engine.

The patent to Nallinger (U.S. Pat. No. 2,914,043) also teaches a stratified charge dual injector system which are supplied by a single pump. This engine is strictly a gasoline engine with the fuel injection system operating at low pressures and is not configured to operate on a diesel or hybrid mode. The Nallinger engine is of an early injection timing type and requires fuels that provide a measure of detonation or autoignition control on combustion, and therefore require octane rated fuels. The Nallinger engine is clearly not configured to operate in a diesel or hybrid mode. The injection system of the present invention is considered a late injection system (main injection starts at approximately 10° BTDC, while pilot injection starts begins at approximately 30° BTDC). Later injection, of course, requires higher injection pressures as in conventional diesel engines.

U.S. Pat. No. 4,239,023 to Simko describes a dual injection system utilized in a pilot or prechamber and main chamber. However, this early injection timing engine is a strictly spark-ignition low output engine based on turbulent flow conditions in both the prechamber and main chamber cavities, while the late-timed engine of the present invention depends upon well organized swirl conditions in both chambers. Both the present invention and Simko are similar in that they both utilize a shuttle valve between the injectors in the prechamber and main chamber, however, the response time with applicant's shuttle valve is shorter and more precise than Simko which includes a variety of slow moving check valves which affect the overall reaction time and timing precision of the system.

A similar stratified charge low-compression turbine fueled experimental engine is being developed by White Engines, Inc. and Texaco, Inc. referred to as the L-163-ST engine (Road and Track, November 1979, pages 39 and 40). The White engine above-mentioned does not include a separate prechamber but rather locates the spark plug in the main chamber and achieves stratification by closely locating the injector to the spark plug.

In SAE Technical Paper No. 830666 titled "The Pencil Nozzle—Past, Present and Future" dated Feb. 28–Mar. 4 1983, illustrates the concept of an ignition-triggering nozzle on page 24, wherein the opening of the nozzle due to pressure rises within the nozzle electrically fires the ignition system in place of a separate ignition distribution system.

The injection system of the present invention includes a novel ignition triggering means in the shuttle valve which fires the spark plug in the prechamber which is not taught by any of the above-mentioned prior art.

SUMMARY OF THE INVENTION

The present invention is directed to an injection system in a hybrid internal combustion engine which uses a stratified charge OTTO cycle during starting, idle, and low specific power operations while gradually converting to a time-spark assisted or a non-assisted compression ignition (diesel) mode as the specific engine outputs increase. The engine can utilize a wide range of fuels with the preferred fuel being turbine fuels, with relatively low compression ratios and high specific power outputs.

The precombustion or pilot chamber located in the cylinder head includes a pilot fuel injector and spark plug. The prechamber is connected to the main combustion chamber by means of a passage or orifice located in such a manner as to induce swirling airflows within the prechamber during the compression stroke. During the compression stroke, the prechamber fuel injection and ignition begins at approximately 30° BTDC which is then ignited by the spark plug initiating the combustion process. At approximately 10° BTDC, the main injector begins to inject as ignition commences from the torch flames emanating from the prechamber. The system is generally considered a late injection system.

Prechamber pilot injection basically precedes main injection in a sequential order at timings from top dead center.

It is therefore the principal object of the present invention to provide a late fuel injection system for combined precombustion injection and main chamber injection in sequential order with a spark ignition means timed to the actuation of a fuel shuttle valve supplying said respective injectors.

Another object of the present invention is to provide a shuttle valve in an injection system which sequentially supplies a prechamber injector followed by a main injector along with an ignition trigger means.

Another object of the present invention is to provide a dual fuel injection nozzle system supplied by a single pump through a shuttle valve which allows a wide range of nozzle operating pressures and nozzle differential operating pressures.

Another object of the present invention is a shuttle valve with decreased and precise reaction times in a dual fuel injection nozzle system including an ignition trigger in the shuttle valve which allows precise relative timings of fuel injection and ignition events.

Another object of the present invention in a dual fuel injection system, is a variable prechamber pilot delivery controlled by power lever position or one or more other power sensitive functions of the engine.

Another object of the present invention in a dual fuel injection nozzle system with the provision of a shuttle valve including a positive valve closure to the main injector in the initial or first position of the shuttle spool.

A further object of the present invention is the provision of a stepped shuttle spool providing pressure amplification functions between the pilot to main fuel injection pressure ratios, including main injection pressures lower than pilot injection pressures.

DESCRIPTION OF THE PREFERRED EMBODIMENT

Figure 1:
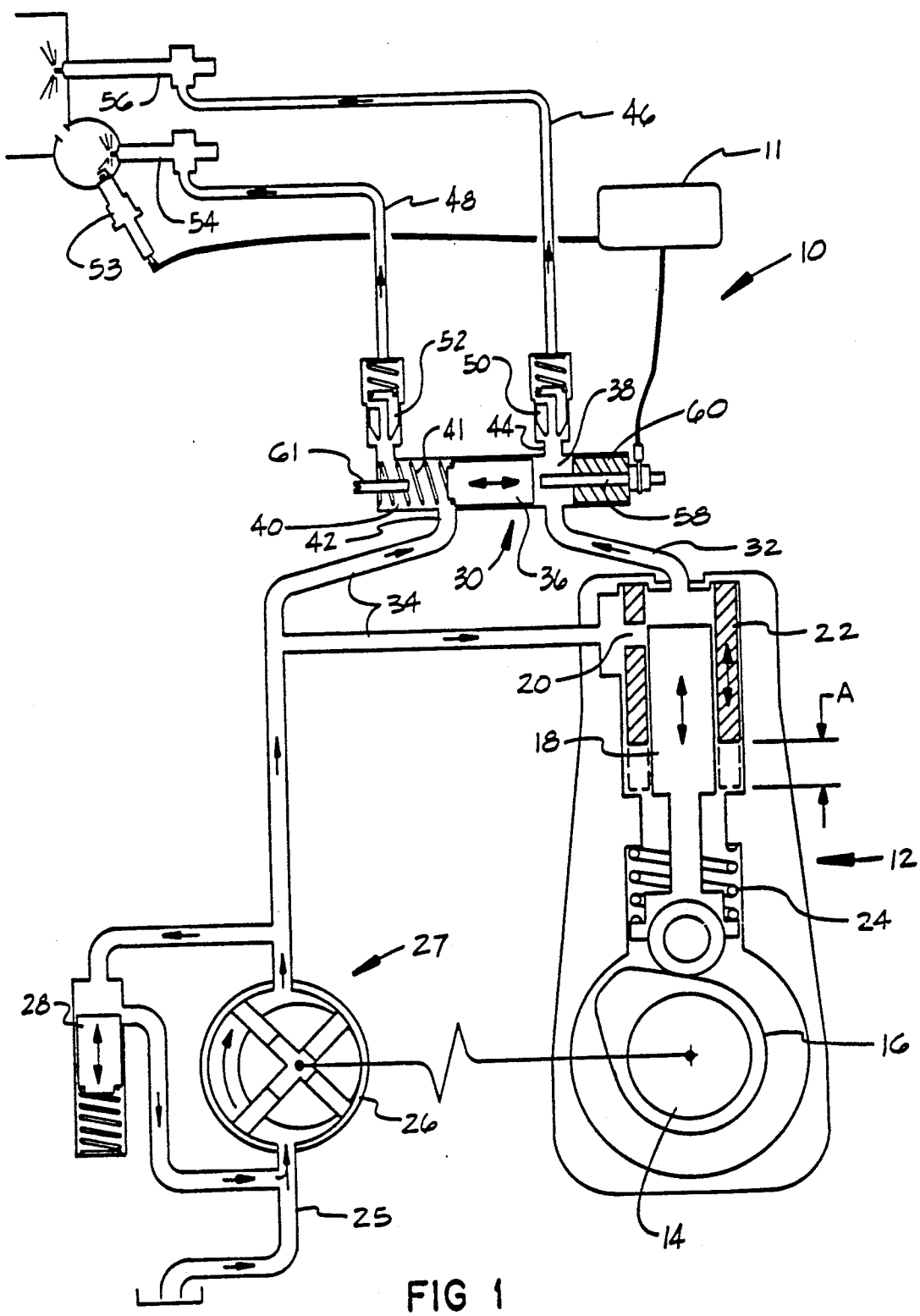
FIG. 1 is a schematic view of the fuel injection system of the present invention.

The injection system of the present invention is generally described by reference numeral 10 as seen in FIG. 1 without most of the various engine parts which it controls. The engine which the present system 10 controls, is set forth in U.S. Pat. Nos. 4,594,976 and 4,765,293. The prechamber injector 54 and main chamber injector 56 are comparable to injectors 22 and 25 of the last-mentioned patent and are standard type diesel injectors. Pilot injector 54 extends into a spherical prechamber which in turn is tangentially joined to the main chamber, as seen in the various figures of the above-mentioned patent.

The pair of injectors 54 and 56 are supplied by a single fuel injection pump 12 which is a standard type fuel injection pump, either of the rotary distributor type or the inline type, both of which are well known in the prior art. FIG. 1 illustrates the injection system for a single cylinder and therefore with a multiple cylinder engine there will be duplicate systems, as shown in FIG. 1, for each cylinder the engine has. Typically a standard distributor type injection pump would have 4 to 8 separate cylinders and 4 to 8 pistons 18, as shown in FIG. 1.

Injection pump 12 is a piston type pump driven by a cam 16 which is attached &o an engine driven shaft 14 and rotates at typically half the engine speed. Typically, a single upward stroke of piston 18 provides the fuel charge for one firing cycle of pilot injector 54 and main injector 56. The fuel injection system 10 also includes a low pressure charging circuit 27 including a feed pump 26 which refills the pump 12 and the shuttle valve chamber 40 on their corresponding suction strokes. Feed pump 26 is a positive displacement pump of any type and includes a relief valve 28 in the charging circuit which allows the pump discharge to return to the inlet of feed pump 26 or to the fuel reservoir 25 and maintains constant pressures ranging from 10 to 60 PSI in the circuit depending on fuel types and system applications. Feed pump 26 also recharges supply chamber 40, as shuttle spool 36 moves rightwardly expanding chamber 40.

Shuttle valve 30 comprises a shuttle spool 36 slidably positioned in a bore with spool actuation chamber 38 on its right end and prechamber supply chamber 40 on its left end. Maximum movement of shuttle spool 36 in the left direction is limited by an adjustment screw 61 while maximum movement in the right direction is limited by ignition trigger pin 58. In the absence of pressure, shuttle spool 36 is moved in the right direction by the bias of return spring 41 while movement in the left direction is caused by a greater fuel pressure differential in chamber 38 over chamber 40. Shuttle spool 36 has a first position to the far right with the right end of spool 30 in contact with ignition trigger 58. Shuttle spool 36 has a second position to the far left with the left end of spool 36 in contact with adjustment screw 61. Low pressure feed pump 26 refills chamber 40 on the left end of spool 36 via line 34 with low pressure fuel as return spring 41 moves spool 36 in a rightward direction. Positioned in the injector supply conduit 48 is a delivery valve 52 which is symbolically shown as a check valve spring-biased to a closed position. Actually the poppet in the delivery valve closes its lateral valving 51 port before the poppet reaches the end of its stroke so that there is an additional downward travel after the lateral flow passage closes so as to relieve the pressure in supply conduit 48. The purpose for these delivery valves 50 and 52 is to prevent the injectors from dribbling after the injectors close and keep the injection lines 46 and 48 primed with fuel for the next injection event. A similar delivery valve 50 is positioned in the main injector supply conduit 46 which supplies main injector 56. Injector 56 which supplies the main combustion chamber of the engine can have any set prearranged opening pressure, however, in a typical instance it would be higher than that of the pilot injector 54 and for example, might be 3000 PSI while the pilot injector 54 may open at 1200 PSI. The particular structure of injector nozzles 54 and 56 are standard in the trade and are therefore not shown in detail.

Standard type injection pump 12 previously mentioned, must have some form of variable output to accommodate variable fuel demands of the engine. To symbolically show this variable feature of pump 12, a vertically slidable sleeve 22 is shown in the drawing which has an inlet valving port 20 supplied by charging fluid from the charging circuit 27. While piston 18 always has the same stroke, the displacement per single stroke of pump 12 maybe varied by moving sleeve 22 up or down so that point at which the compression stroke begins can be varied. The pumping stroke will approximately begin at the point as illustrated in PIG 1 wherein the edge of piston 18 passes over and closes inlet valve port 20 thereby preventing any further back flow in low pressure line 34. Once valving port 20 is closed, the additional upward stroke of piston 18 will be the total displacement of fluid forced through injectors 54 and 56. Spring 24 in the pump returns the piston 18 to the bottom of its stroke as cam 16 shortens its contacting radius. At idle power settings of the engine, sleeve 22 would be moved upwardly to its illustrated position so that valving port 20 closes just prior to the end of its stroke so that the main injection charge was very small or zero. For maximum power settings, sleeve 22 could be moved downwardly so that valving port 20 closes sooner and the full stroke of fluid, as indicated by arrows A would be delivered to the pilot and main injectors 54 and 56 respectively.

Figures 2, 3:
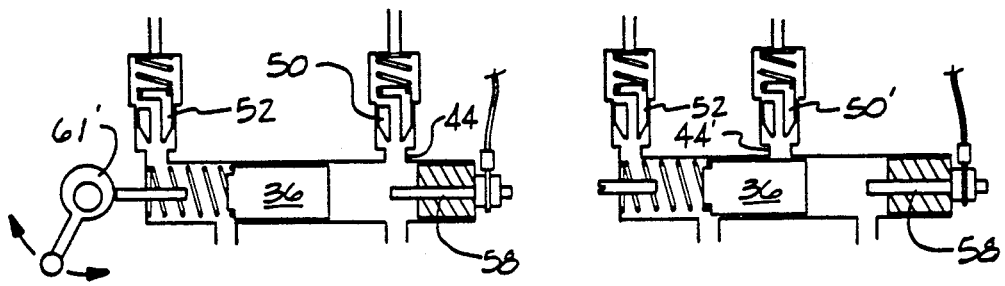
FIG. 2 is a symbolic view of the shuttle valve of a modified form which allows a variable pilot delivery.
FIG. 3 is a symbolic view of the shuttle valve of a further modified form.

As piston 18 moves upward closing valve port 20, fluid thereabove is forced through pump output line 32 into spool actuating chamber 38. This increased pressure in Chamber 38 forces shuttle spool 36 to move in a leftward direction enlarging chamber 38 while supply chamber 40 reduces in volume at a similar rate. Once the left end of shuttle spool 36 passes over valving port 42, back flow stops in low pressure charging line 34 and the fluid trapped in chamber 40 begins to rise in pressure. This increasing pressure causes the poppet in delivery 52 to lift against its biasing spring and open chamber 40 into injector supply conduit 48. As the rising pressure reaches the opening pressure of injector 54, the nozzle opens and the pilot charge of fuel is sprayed into the engine prechamber which is not shown in the drawings. The flow to the prechamber stops when spool 36 contacts adjustment screw 61 and injector 54 closes. After injector 54 closes, delivery valve 52 seats its poppet and further drops the pressure in conduit 48. With spool 36 stopped by screw 61, the increasing pressure in chamber 38 due to movement of piston 18 will force the remaining fluid from its stroke out main injector 56 through delivery valve 50. Before main injector 56 opens, the pressure in main injector supply conduit 46 must rise to the opening pressure of the injector. The amount of fuel injected in the main injector varies with the prearranged position of valving sleeve 22 in pump 12 previously discussed. In FIG. 3 valving port 44, to the main injector 56 is not opened until spool 36 moves to its second position.

OPERATION

The fuel injection system of the present invention is illustrated in FIG. 1 with a single cylinder, however, in most applications there will be multiple cylinders of varying numbers, each of which will have a complete circuit, as shown in FIG. 1. The cams 16 for each cylinder will all be on a common shaft 14 with different angular positions as determined by their firing orders. Charging circuit 27 which includes a low pressure feed pump 26 and a relief valve 28 constantly supplies a low pressure to both the charge lines 34 to injection pump 12 and also to chamber 40 in shuttle valve 30.

As the injection pump 12 begins its compression stroke. piston 18 moves upward displacing fluid from the pump cylinder which back flows in charge line 34 until valving port 20 is closed by piston 18. Further movement of piston 18 displaces its fluid through pump output line 32 into spool actuation chamber 38. Rising pressure in chamber 38 causes shuttle spool 36 to move in a leftward direction closing valving port 42. The measured amount of fuel trapped in chamber 40 is forced across delivery valve 52 and out prechamber injector 54 once the opening pressure oi the injector is reached. When spool 36 contacts screw 61 the pressure in chamber 38 rises further &o the opening pressure of main injector 56. The duration and amount of fuel flow to main injector 56 varies with the setting of movable sleeve 22 in pump 12. After leftward movement of spool 36 away from ignition trigger 58, the spark plug 53, in the prechamber of the engine is fired by the ignition system 11 thus igniting the pilot flow as it is injected through prechamber injector 54. The spark may be a single or series of sparks. Once shuttle spool 36 ends its leftward movement, pilot injector 54 closes with the assistance of delivery valve 52. As the injector pump piston 18 reaches the end of its stroke, pressure drops in chamber 38 and line 56, and main injector 56 closes.

Spring 24 in injector pump 12 returns piston 18 to its next compression stroke while spring 41 returns shuttle spool 36 to its far right first position before the next pump delivery stroke.

If it is desirable to vary the prechamber charge, a variable stop means 61' can be utilized, as shown in FIG. 2, which can be connected to the power lever or some other related engine function.

In a modified valving arrangement, valving port 44' can be moved to the left, as shown in FIG. 3, so that chamber 38 is closed to injector 56 until spool 36 moves leftward towards its second position.

Figure 4:
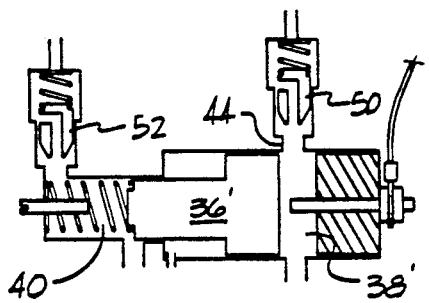
FIG. 4 is a symbolic view of the shuttle valve of a still further modified form.
Figure 5:
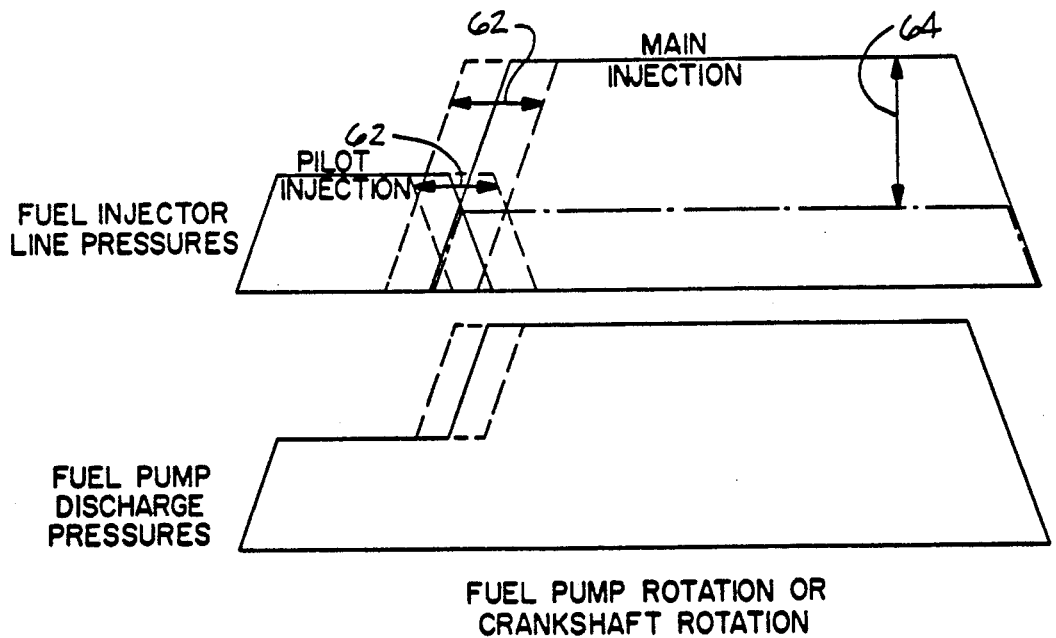
FIG. 5 is a graph illustrating the operating flows of the injection pump through a complete injection cycle.

The shuttle spool 36 can be constructed in a stepped fashion 36', as shown in FIG. 4, so that the pressure in the prechamber or pilot circuit can be amplified above that in the main injector circuit if desired so as to provide a wide range of pilot to main fuel injection pressure ratios. FIG. 5 illustrates the fuel injector line pressures and pump discharge pressures during crankshaft rotation or injection pump rotation.

The flow changes 62 of the pilot delivery can be made by adjustable means 61', as shown in FIG. 5, along with lower main injection pressures 64 which can be achieved with the stepped spool 36' of FIG. 4.

From the foregoing statements, summary and description in accordance with the present invention, it is understood that the same are not limited thereto, but are susceptible to various changes and modifications as known to those skilled in the art and we therefore do not wish to be limited to the details shown and described herein, but intend to cover all such changes and modifications which would be encompassed by the scope of the appended claims.

I claim:
1. A fuel injection system in a stratified charge hybrid internal combustion engine including a main combustion chamber, a precombustion chamber connected with the main chamber, fuel injectors in the main combustion chamber and precombustion chamber which open at higher and lower pressure levels respectively to sequentially inject fuel into the prechamber and the main chamber, timed spark ignition means in the prechamber for ignition of the fuel-air mixture therein, and an engine driven and timed fuel injection pump having a variable output capacity that varies with power level position, the injection pump is supplied by a low pressure charging pump, the improvement comprising:

a shuttle valve including a bore therein.

a shuttle spool means positioned within the bore defining a prechamber supply chamber on one side thereof and a spool activation chamber on the opposite side thereof said spool means having a first and second position;

biasing means urging the spool towards it first position with the spool actuation chamber at its minimum volume;

first conduit means connecting charging pressure to the prechamber supply chamber in the first position oi the spool means;

second conduit means connecting the injection pump to spool actuation chamber:

third conduit means connecting the spool actuating chamber with the main injector;

fourth conduit means connecting the prechamber supply chamber with the prechamber injector;

the initial charge from the injection pump actuates the spool means from its first to its second position, valving closed the first conduit means and displacing the spool means into the prechamber supply chamber, a fuel displacement amount required in the prechamber injector until the spool means reaches its second position whereupon the fuel pressure from the injection pump rises to the opening level of the main injector flowing through the spool actuation chamber and electrical ignition trigger means in the shuttle valve which triggers the ignition means as the spool means moves from its first position.

2. A fuel injection systems as set forth in claim 1, wherein the spool means valves the third conduit means closed from the spool actuating chamber in the first position of the spool means.

3. A fuel injection system as set forth in claim 1 wherein the ignition trigger means comprises an insulated electrical terminal positioned in the spool actuation chamber limiting movement of the spool means by direct contact therewith in the first position of the spool, the terminal in turn is electrically connected to the ignition means of the engine whereby when electrical contact is broken between the terminal and the spool means the ignition means is triggered.

4. A fuel injection system as set forth in claim 1 wherein the ignition trigger means comprises an insulated electrical terminal position in the spool actuation chamber as a stop for the spool means which is urged thereagainst in contacting relation by said biasing means in the first position of the valve spool, the terminal in turn is connected to the ignition means of the engine whereby when contact is broken between the terminal and the spool means the ignition means is triggered.

5. A fuel injection system as set forth in claim 1 including a variable limit stop means in the prechamber supply chamber which varies the extent of travel of the spool means in the second position whereby the amount of fuel injected into the prechamber can be varied as a function of the power lever position.

6. A fuel injection system as set forth in claim 1 including variable limit stop means in the prechamber supply chamber which varies the extent of travel of the spool means in the second position whereby the amount of fuel injected into the prechamber can be varied as a function of one or more power-related functions.

* * * * *